United States Patent
Baumgart et al.

(10) Patent No.: US 6,756,072 B2
(45) Date of Patent: Jun. 29, 2004

(54) MULTI-COMPONENT COATINGS, ADHESIVES AND SEALANTS AND THE USE THEREOF

(75) Inventors: Hubert Baumgart, Münster (DE); Heinz-Peter Rink, Münster (DE); Simone Jurczik, Senden (DE); Edeltraud Hagemeister, Greven (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/240,861

(22) PCT Filed: Apr. 26, 2001

(86) PCT No.: PCT/EP01/04700
§ 371 (c)(1),
(2), (4) Date: Oct. 4, 2002

(87) PCT Pub. No.: WO01/83579
PCT Pub. Date: Nov. 8, 2001

(65) Prior Publication Data
US 2003/0104132 A1 Jun. 5, 2003

(30) Foreign Application Priority Data
Apr. 29, 2000 (DE) .......................................... 100 21 139

(51) Int. Cl.[7] ........................ C09D 175/04; C09J 175/04
(52) U.S. Cl. ................. 427/195; 427/385.5; 427/388.2; 427/393.5; 525/123; 525/127; 525/128; 525/934; 528/69; 528/73
(58) Field of Search ............................... 427/195, 385.5, 427/388.2, 393.2; 525/123, 127, 128, 934; 528/69, 73

(56) References Cited

U.S. PATENT DOCUMENTS

| | | | |
|---|---|---|---|
| 4,002,601 A | 1/1977 | Hajek et al. ................ 260/77.5 |
| 4,522,913 A | 6/1985 | Kanno et al. ................ 430/285 |
| 5,412,056 A | 5/1995 | Zwiener et al. ............... 528/73 |
| 5,716,678 A | 2/1998 | Röckrath et al. .......... 427/407.1 |
| 5,744,569 A | 4/1998 | Bruchmann et al. .......... 528/73 |
| 6,261,645 B1 | 7/2001 | Betz et al. .................. 427/500 |
| 6,410,646 B1 | 6/2002 | Röckrath et al. ............ 525/124 |

FOREIGN PATENT DOCUMENTS

| | | | |
|---|---|---|---|
| DE | 196 09 617 | 9/1997 | ......... C09C/271/06 |

OTHER PUBLICATIONS

English Language Translation of DE 19850210 USSN 09/830,440 Filed May 15, 2001, BASF et al. pp. 1–43, and Abstract.

*Primary Examiner*—Patricia A. Short

(57) ABSTRACT

Multicomponent coating materials, adhesives and sealing compounds comprising a (meth)acrylate (A) containing, based on (A), up to 90% by weight of hydroxyl-containing monomers in copolymerized form, of which (a1) from 20–90% by weight, based on (A), are 4-hydroxybutyl (meth) acrylate and/or 2-alkylpropane-1,3-diol mono(meth) acrylate, and (a2) from 0–40% by weight based on (A), are other hydroxyl-containing monomers; and (B) an adduct preparable from (b1) a diisocyanate, and (b2) a compound of the general formula I having an isocyanate-reactive group:

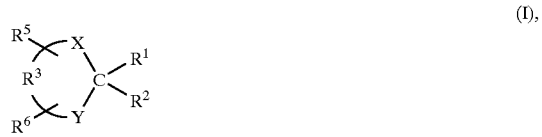

(I), wherein $R^1$ and $R^2$ are hydrogen or alkyl radicals, X and Y are oxygen, sulfur or >N—$R^6$ where $R^6$ is alkyl radical or aryl radical, $R^3$ is alkylene radical and $R^4$ and $R^5$ are hydrogen, isocyanate-reactive groups or radicals $R^6$; where $R^4$, $R^5$ or $R^6$ contains an isocyanate-reactive group or $R^4$ or $R^5$ is an isocyanate-reactive functional group, and where $R^4$, $R^5$ or $R^6$, where present, contain no isocyanate-reactive groups and the molar ratio of isocyanate groups in (b1) to the isocyanate-reactive groups in the compound I is 1.0.

18 Claims, No Drawings

MULTI-COMPONENT COATINGS, ADHESIVES AND SEALANTS AND THE USE THEREOF

This application is a National Phase of Patent Application PCT/EP01/04700 filed Apr. 26, 2001.

The present invention relates to novel multicomponent coating materials, adhesives and sealing compounds. The present invention further relates to the use of the novel multicomponent coating materials for producing novel clearcoat systems or color- and effect-imparting solid-color topcoat, basecoat and multicoat systems in the OEM finishing and refinishing of motor vehicles, in the interior and exterior coating of constructions, in furniture, window and door coating and in industrial coating, including coil coating, container coating, and the impregnation of electrical engineering components. The present invention relates additionally to the use of the novel multicomponent adhesives and sealing compounds for producing novel adhesive films and seals, especially in the fields of use recited above.

Two-component coating materials comprising—in very general terms—reactive components having isocyanate-reactive functional groups, customary and known polyisocyanates, and adducts of diisocyanates and dioxolanes, dioxanes or oxazolidines which have an isocyanate-reactive functional group, in a molar ratio of 1:1, are known from German Patent Application DE 196 09 617 A1.

According to page 3, line 68 to page 4, line 10, said reactive components comprise, inter alia, hydroxy-functional polymers having a hydroxyl group content of from 0.1 to 20% by weight (corresponding to from 33 to 660 mg KOH/g). The number-average molecular weight of the polymers is preferably from 1000 to 100,000. The polymers contain preferably more than 50% by weight of $C_1$–$C_{20}$ alkyl (meth)acrylate, vinyl aromatics having up to 20 carbon atoms, vinyl esters of carboxylic acids containing up to 20 carbon atoms, vinyl halides, nonaromatic hydrocarbons having 4 to 8 carbon atoms and 1 or 2 double bonds, unsaturated nitrites, and mixtures thereof. Preference is given to polymers containing up to 60% by weight of $C_1$–$C_{10}$ alkyl (meth)acrylates, styrene, or mixtures thereof.

Furthermore, the polymers include hydroxy-functional monomers, corresponding to the above hydroxyl group content, and also other monomers, which are not specified in any greater detail, such as unsaturated acids, especially carboxylic acids, acid anhydrides, or acid amides.

According to page 9, lines 30 to 45, "Preparation and testing of the clearcoats with the compounds A—two-component system", the hydroxy-functional vinyl polymer Lumitol® H 136 from BASF Aktiengesellschaft, having an OH number of 136 mg KOH/g, is used as the reactive component. These known clearcoats have a high solids content of up to 76% by weight. The clearcoat finishes produced from them possess good mechanical properties, in particular a high level of hardness and flexibility, and also high chemical resistance.

The two-component coating materials known from DE 196 09 617 A1 are, however, not so broadly applicable as would in fact be desirable. Moreover, there is a need to extend their pot life, that is to say the time within which, after the two components have been mixed, the coating materials can be processed without problems and give flawless coatings.

German Patent DE 197 09 467 C 2 or German Laid-Open Specification DE 197 09 465 A 1 disclose heat-curable coating materials based on hydroxyl-containing binders and crosslinking agents which comprise hydoxyl-reactive functional groups. After their curing they have a storage modulus E' in the rubber-elastic range of at least $10^{7.6}$ Pa and a loss factor tan δ at 20° C. of not more than 0.10, the storage modulus E' and the loss factor having been measured by means of dynamic mechanical thermoanalysis on free films having a thickness of 40±10 μm. Binders used include, inter alia, (meth)acrylate copolymers containing 4-hydroxybutyl methacrylate in a copolymerized form. The coatings produced from the known coating materials are scratch-resistant and chemical-stable. Nevertheless, it is necessary to improve further on the level of scratch resistance already obtained, for particularly demanding end uses: for example, in the OEM finishing and refinishing of particularly high-value, top-class automobiles. Furthermore, the known coatings ought to have even better polishability.

Methylpropane-1,3-diol mono(meth)acrylate and its polymers of low molecular weight are known from German Patent Application DE 32 34 045 A 1. The polymers are used to prepare light-sensitive compositions which are used for imagewise exposure. It is unknown whether they are also suitable for the production of multicomponent coating materials, adhesives or sealing compounds.

German Patent Application DE 198 50 210.9, unpublished at the priority date of the present specification, describes the use of 2-methyl-propane-1,3-diol mono(meth)acrylate to prepare (meth)acrylate copolymers. The (meth)acrylate copolymers in question are used to prepare multicomponent coating materials, adhesives and sealing compounds. The multicomponent coating materials give scratch-resistant coatings, especially clearcoats.

It is an object of the present invention to further develop the known multicomponent coating materials while losing nothing of the profile of properties already achieved so as to give new, advantageous multicomponent coating materials which have a high solids content at low viscosity and have a long pot life and which give coatings, especially clearcoat systems and color- and/or effect-imparting solid-color topcoat, basecoat and multicoat systems, which in addition to a high level of hardness, flexibility and chemical resistance also possess outstanding flowout, very good intercoat adhesion, an outstanding overall visual impression, very good weathering stability, very high scratch resistance, and very good polishability. It is also an object of the present invention to further develop the existing two-component adhesives and sealing compounds to give new multicomponent adhesives and sealing compounds having a high solids content and low viscosity and a long pot life which give adhesive films of especially high bond strength and seals having a particularly high sealing capacity even to chemically aggressive substances.

Accordingly we have found the novel multicomponent coating materials, adhesives and sealing compounds comprising (A) at least one (meth)acrylate copolymer having an OH number from 130 to 200, a glass transition temperature of from −35 to +60° C., a number-average molecular weight of from 1000 to 5000 daltons and a mass-molecular weight of from 2000 to 20,000 daltons, which contains, based on the (meth)acrylate copolymer (A), up to 90% by weight of hydroxyl-containing, olefinically unsaturated monomers (a) in copolymerized form, of which (a1) from 20 to 90% by weight, based on the (meth)acrylate copolymer (A), are hydroxybutyl (meth)acrylate and/or 2-alkylpropane-1,3-diol mono(meth)acrylate, and (a2) 0 to 40% by weight based on the (meth)acrylate copolymer (A), are other hydroxyl-containing, olefinically unsaturated monomers;
and
(B) at least one adduct preparable from
(b1) at least one diisocyanate and
(b2) at least one compound of the general formula I having an isocyanate-reactive functional group:

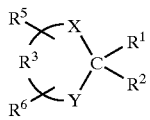
(I), in which the variables have the following definitions:

$R^1$ and $R^2$ independently of one another are hydrogen atoms or alkyl radicals having 1 to 10 carbon atoms;

X and Y independently of one another are oxygen atom, sulfur atom or a radical $>N-R^6$, in which $R^6$ is an aliphatic radical having 1 to 30 carbon atoms, whose carbon chain may be interrupted by one or more oxygen atoms, or is an aromatic group having 6 to 30 carbon atoms;

$R^3$ is an alkylene radical having 1 to 5 carbon atoms; and $R^4$ and $R^5$ independently of one another are hydrogen atoms, isocyanate-reactive functional groups or radicals $R^6$;

with the proviso that one radical $R^4$, $R^5$ or $R^6$ contains an isocyanate-reactive functional group or one radical $R^4$ or $R^5$ is an isocyanate-reactive functional group, in which case the other radicals $R^4{}_1$ $R^5$ or $R^6$—where present—contain no isocyanate-reactive functional groups;

the molar ratio of isocyanate groups in the diisocyanates (b1) to the isocyanate-reactive functional groups in the compound I being from 0.8:1.2 to 1.2:0.8.

In the text below, the novel multicomponent coating materials, adhesives and sealing compounds are referred to for brevity as "coating materials, adhesives and sealing compounds of the invention".

Furthermore, the novel process for producing a clearcoat system by applying a clearcoat to a primed or unprimed substrate or a coating system present thereon has been found in which the coating material of the invention is used as the clearcoat.

Furthermore, the novel process for producing a color and/or effect coating system by applying a pigmented solid-color topcoat to a primed or unprimed substrate has been found in which the coating material of the invention is used as the solid-color topcoat.

Not least, the novel process for producing a multicoat color and/or effect coating system on a primed or unprimed substrate by (1) applying a basecoat to the substrate,
(2) drying and/or partially curing or completely curing the basecoat film,
(3) applying a clearcoat to the dried and/or partially cured basecoat film or to the cured basecoat, and
(4) curing the clearcoat film together with the basecoat film, or separately curing the clearcoat film, has been found in which (a) a conventional basecoat and the coating material of the invention as the clearcoat, (b) a conventional clearcoat and the coating material of the invention as basecoat, or
(c) a pigmented and an unpigmented coating material of the invention, as basecoat and as clearcoat, are used.

Not least, the novel process for producing novel adhesive films and/or seals on and in primed and unprimed substrates has been found in which adhesives and/or sealing compounds of the invention are applied onto and/or into the substrates and cured.

In the text below, the novel processes are referred to collectively as "processes of the invention".

Further subjects of the invention will emerge from the description.

In the light of the prior art, it was surprising and unforeseeable for the skilled worker that the object on which the present invention is based could be achieved by the specific combination of a selected (meth)acrylate copolymer (A) and of an adduct (B) which gives rise to the preferential profile of properties of the novel coating materials, adhesives and sealing compounds of the invention and of the coatings, adhesive films and seals produced from them. A further surprise was the extraordinarily broad applicability of the specific combination. Yet a further surprise was the good reflow behavior of the coatings of the invention.

The coating materials, adhesives and sealing compounds of the invention are multicomponent systems. This means that their highly reactive constituents are present in a form in which they are divided between a plurality of components which, viewed individually, are stable on storage, and said constituents are not combined until a comparatively short time before use. In the context of the present invention, "comparatively short" means a period of from 1 min to 24 h and "stable on storage" means that the component in question can be stored for at least 24 h, preferably for at least one week, without decomposition and/or premature crosslinking. The constituents are preferably divided between two components, the binders and, if present, the reactive diluents being present in one component and the crosslinking agents in the other.

The first component of the coating materials, adhesives and sealing compounds of the invention comprises the component containing binder.

The essential constituent of the binder-containing component for use in accordance with the invention is at least one binder. In accordance with the invention, this comprises at least one (meth)acrylate copolymer (A) having specific properties and a specific composition.

Thus the (meth)acrylate copolymer (A) for use in accordance with the invention has an OH number of from 130 to 200, preferably from 135 to 190, preferably from 140 to 185, and in particular from 145 to 180 mg KOH/g, a glass transition temperature of from −35 to +60, in particular from −20 to +40, ° C., a number-average molecular weight of from 1000 to 5000 daltons, in particular from 2000 to 4500 daltons, and a mass-average molecular weight of from 2000 to 20,000 daltons, in particular from 4000 to 16,000 daltons.

The (meth)acrylate copolymer (A) contains, based in each case on (A), up to 90, preferably up to 88, more preferably up to 86, with particular preference up to 84, with very particular preference up to 82, and in particular up to 80, % by weight of hydroxyl-containing, olefinically unsaturated monomers (a) in copolymerized form, of which (a1) from 20 to 90, preferably from 22 to 88, more preferably from 24 to 86, with particular preference from 26 to 84, with very particular preference from 28 to 82, and in particular from 30 to 80, % by weight, based in each case on the (meth)acrylate copolymer (A), are 4-hydroxybutyl (meth)acrylate and/or 2-alkylpropane-1,3-diol mono(meth)acrylate, and (a2) from 0 to 40, preferably from 1 to 38, more preferably from 2 to 36, with particular preference from 3 to 34, with very particular preference from 4 to 32, and in particular from 6 to 30, % by weight, based in each case on the (meth)acrylate copolymer (A), are other hydroxyl-containing, olefinically unsaturated monomers.

Examples of suitable 2-alkylpropane-1,3-diol mono(meth)acrylates (a1) are 2-methyl-, 2-ethyl-, 2-propyl-, 2-isopropyl- or 2-n-butyl-propane-1,3-diol mono(meth)acrylate, of which 2-methylpropane-1,3-diol mono(meth)acrylate is particularly advantageous and, is used preferably in accordance with the invention.

Examples of suitable other hydroxyl-containing, olefinically unsaturated monomers (a2) are hydroxyalkyl esters of acrylic acid, methacrylic acid or another hydroxyalkyl esters of acrylic acid, methacrylic acid or another alpha, beta-ethylenically unsaturated carb-oxylic acid (i) derived from an alkylene glycol which is esterified with the acid, or (ii) obtainable by reacting the acid with an alkylene oxide such as ethylene oxide or propylene oxide; especially hydroxyalkyl esters of acrylic acid, methacrylic acid, crotonic acid or ethacrylic acid in which the hydroxyalkyl group contains up to 20 carbon atoms, such as 2-hydroxyethyl, 3-hydroxypropyl, 3-hydroxybutyl methacrylate, ethacrylate or crotonate; 1,4-bis(hydroxymethyl)cyclohexane or octahydro-4,7-methano-1H-indene-dimethanol monoacrylate, monomethacrylate, monoethacrylate or monocrotonate; or reaction products of cyclic esters, such as epsilon-caprolactone, for example, and these hydroxyalkyl esters; or olefinically unsaturated alcohols such as allyl alcohol; or polyols such as trimethylolpropane monoallyl or diallyl ether or pentaerythritol monoallyl, diallyl or triallyl ether. These higher-functional monomers (a2) are used generally only in minor amounts. In the context of the present invention, minor amounts of higher-functional monomers (a2) are amounts which do not lead to crosslinking or gelling of the (meth)acrylate copolymers (A) unless the intention is that the copolymers should be present in the form of crosslinked microgel particles.

Also suitable as monomers (a2) are ethoxylated and/or propoxylated allyl alcohol, which is sold by Arco Chemicals, or 2-hydroxyalkyl allyl ethers, especially 2-hydroxyethyl allyl ether. If used, they are used preferably not as sole monomers (a2) but in an amount of from 0.1 to 10% by weight, based on the (meth)acrylate copolymer (A).

Also suitable are reaction products of acrylic acid and/or methacrylic acid with the glycidyl ester of an alpha-branched monocarboxylic acid having 5 to 18 carbon atoms per molecule, especially a Versatic® acid, or, instead of the reaction products, an equivalent amount of acrylic and/or methacrylic acid which is then reacted, during or after the polymerization reaction, with the glycidyl ester of an alpha-branched monocarboxylic acid having 5 to 18 carbon atoms per molecule, in particular a Versatic® acid (cf. Römpp Lexikon Lacke und Druckfarben, Georg Thieme Verlag, Stuttgart, N.Y., 1998, "Versatic® acids", pages 605 and 606).

Furthermore, the (meth)acrylate copolymers (A) comprise further olefinically unsaturated monomers (a3), whose proportion in (A) is at least 10, preferably at least 12, more preferably at least 14, with particular preference at least 16, with very particular preference at least 18, and in particular at least 20, % by weight.

Examples of Suitable Monomers (a3) are

Monomers (a31)

(Meth)acrylic esters which are essentially free from acid groups, such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indene-methanol or tert-butylcyclohexyl (meth)acrylate; (meth)acrylic oxaalkyl or oxacycloalkyl esters such as ethoxytriglycol (meth)acrylate and methoxyoligoglycol (meth)acrylate having a molecular weight Mn of preferably 550 daltons or other ethoxylated and/or propoxylated, hydroxyl-free (meth)acrylic acid derivatives (further examples of suitable monomers (a2) of this kind are known from the laid-open specification DE 196 25 773 A1, column 3, line 65 to column 4, line 20). In minor amounts they may contain higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylolpropane-di- or -tri(meth)acrylate; or pentaerythritol di-, tri- or tetra(meth)acrylate. As far as the amounts of higher-functional monomers (a31) are concerned, the comments made above with respect to the monomers (a2) apply.

Monomers (a32)

Ethylenically unsaturated monomers carrying at least one acid group, preferably a carboxyl group, per molecule, or a mixture of such monomers. As component (a32) it is particularly preferred to use acrylic acid and/or methacrylic acid. However, it is also possible to use other ethylenically unsaturated carboxylic acids having up to 6 carbon atoms in the molecule. Examples of such acids are ethacrylic acid, crotonic acid, maleic acid, fumaric acid and itaconic acid. It is also possible to use ethylenically unsaturated sulfonic or phosphonic acids, or their partial esters, as component (a32). Further suitable monomers (a32) are maleic acid mono (meth)acryloyloxyethyl ester, succinic acid mono(meth) acryloyloxyethyl ester and phthalic acid mono(meth) acryloyloxyethyl ester, and also vinylbenzoic acid (all isomers), alpha-methylvinylbenzoic acid (all isomers) or vinylbenzenesulfonic acid (all isomers). Further examples of acid-group-containing monomers (a32) are known from the laid-open specification DE 196 25 773 A1, column 2, line 58 to column 3, line 8, or from International Patent Application WO 98/49205, page 3, lines 23 to 34.

Monomers (a33)

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer and diisobutylene. Alternatively, the vinyl esters may be prepared in a conventional manner from the acids; for example, by reacting the acid with acetylene. Particular preference, owing to their ready availability, is given to the use of vinyl esters of saturated aliphatic monocarboxylic acids having 9 to 11 carbon atoms which are branched on the alpha carbon atom.

Monomers (a34)

N,N-Diethylamino-alpha-methylstyrene (all isomers), N,N-diethylaminostyrene (all isomers), alkylamine, crotylamine, 2-N,N-dimethyl-, 2-N-ethyl-, 2-N,N-diethyl-, 2-amino- or 2-N-methyl-, 2-N-propyl-, 2-N,N-dipropyl-, 2-N-butyl-, 2-N-N-dibutyl-, 2-N-cyclohexyl or 2-N,N-cyclohexyl-methyl-amino or 2-N,N,N,N-tetramethylammonium- or 2-N,N-dimethyl-N,N-diethy-ammonium-, 2-tetramethylphosphonium or 2-triethylsulfonium-ethyl acrylate, -ethyl methacrylate, -propyl acrylate or -propyl methacrylate, or 3-amino- or 3-N,N-dimethyl-, 3-N-methyl-, 3-N-ethyl-, 3-N,N-diethyl-, 3-N-propyl-, 3-N,N-dipropyl-, 3-N-butyl-, 3-N,N-dibutyl-, 3-N-cyclohexyl- or 3-N,N-cyclohexylmethylamino or 3-N,N,N,N-tetramethylammonium- or 3-N,N-dimethyl-N,N-diethylammonium-, 3-tetramethylphosphonium- or 3-triethylsulfoniumpropyl acrylate or -propyl methacrylate.

Monomers (a35)

Diarylethylenes, especially those of the general formula V:

$$R^7R^8C\!=\!CR^9R^{10} \qquad (V),$$

in which the radicals $R^7$, $R^8$, $R^9$ and $R^{10}$ in each case independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, isobutyl, tert-butyl, amyl, hexyl or 2-ethylhexyl. Examples of suitable cycloalkyl radicals are cyclobutyl, cyclopentyl or cyclohexyl. Examples of suitable alkylcycloalkyl radicals are methylenecyclohexane, ethylenecyclohexane or propane-1,3-diylcyclohexane. Examples of suitable cyclo-alkylalkyl radicals are 2-, 3- or 4-methyl-, -ethyl-, -propyl- or -butylcyclohex-1-yl. Examples of suitable aryl radicals are phenyl, naphthyl or biphenylyl, preferably phenyl and naphthyl and especially phenyl. Examples of suitable alkyl aryl radicals are benzyl or ethylene- or propane-1,3-diylbenzene. Examples of suitable cycloalkylaryl radicals are 2-, 3- or 4-phenylcyclohex-1-yl. Examples of suitable arylalkyl radicals are 2-, 3- or 4-methyl-, -ethyl-, -propyl- or -butylphen-1-yl. Examples of suitable arylcycloalkyl radicals are 2-, 3- or 4-cyclohexylphen-1-yl. The aryl radicals $R^7$, $R^8$, $R^9$ and/or $R^{10}$ are preferably phenyl or naphthyl radicals, especially phenyl radicals. The substituents that may be present in the radicals $R^7$, $R^8$, $R^9$ and/or $R^{10}$ are electron withdrawing or electron donating atoms or organic radicals, especially halogen atoms, nitrile, nitro, partially or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals; arylthio, alkylthio and cycloalkylthio radicals and/or primary, secondary and/or tertiary amino groups. Diphenylethylene, dinaphthaleneethylene, cis- or trans-stilbene, vinylidene-bis(4-N,N-dimethylaminobenzene), vinylidene-bis(4-aminobenzene)-or vinylidene-bis(4-nitrobenzene), especially diphenylethylene (DPE), are particularly advantageous and so are used with preference. In the context of the present invention, the monomers (a35) are used in order to regulate the copolymerization advantageously such that batchwise free-radical copolymerization is also possible.

Monomers (a36)

Cyclic and/or acyclic olefins such as ethylene, propylene, but-1-ene, pent-1-ene, hex-1-ene, cyclo-hexene, cyclopentene, norbornene, butadiene, isoprene, cyclopentadiene and/or dicyclopentadiene.

Monomers (a37)

Amido-containing monomers such as (meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl-, N,N-cyclo-hexylmethyl- and/or N-methylol-, N,N-dimethylol-, N-methoxymethyl-, N,N-di(methoxymethyl)-, N-ethoxy-methyl- and/or N,N-di(ethoxyethyl)-(meth)acrylamide; monomers containing carbamate groups, such as (meth)acryloyloxyethyl carbamate or (meth)acryloyl-oxypropyl carbamate; or monomers containing urea groups, such as ureidoacrylate or ureidomethacrylate;

Monomers (a38)

Monomers containing epoxide groups, such as the glycidyl ester of acrylic acid, methacrylic acid, ethacrylic acid, crotonic acid, maleic acid, fumaric acid and/or itaconic acid.

Monomers (a39)

Vinylaromatic hydrocarbons such as styrene, vinyl toluene, diphenylethylene or alpha-alkylstyrenes, especially alpha-methylstyrene;

Monomers (a310)

Nitriles such as acrylonitrile and/or methacrylonitrile;

Monomers (a311)

Vinyl compounds, especially vinyl halides and/or vinylidene dihalides, such as vinyl chloride, vinyl fluoride, vinylidene dichloride or vinylidene difluoride; N-vinyl amides such as vinyl-N-methylformamide, N-vinylcaprolactam or N-vinyl pyrrolidone; 1-vinylimidazole; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

Monomers (a312)

Allyl compounds, especially allyl ethers and allyl esters such as allyl methyl, ethyl, propyl or butyl ether or allyl acetate, propionate or butyrate.

Monomers (a313)

Polysiloxane macromonomers having a number-average molecular weight Mn of from 1000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to 10,000, and in particular from 3000 to 7000 and having on average from 0.5 to 2.5, preferably from 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in International Patent Application WO 92/22615 on page 12, line 18 to page 18, line 10.

Monomers (a314)

Acryloxysilane-containing vinyl monomers, preparable by reacting hydroxy-functional silanes with epichlorohydrin and subsequently reacting the reaction product with (meth)acrylic acid and/or hydroxyalkyl esters and/or hydroxycycloalkyl esters of (meth)acrylic acid and/or further hydroxyl-containing monomers (a2).

The monomers (a1) and (a3) and, if appropriate, (a2) are selected so as to give the abovementioned OH numbers and glass transition temperatures. Moreover, the nature and amount of the monomers (a3), which contain reactive functional groups, are selected so as not to inhibit or prevent completely the crosslinking reactions of the hydroxyl groups with the below-described adducts (B) and/or crosslinking agents (C) in the second component.

The selection of the monomers (a) for adjusting the glass transition temperatures can be undertaken by the skilled worker with the aid of the following formula of Fox, by means of which the glass transition temperatures of poly (meth)acrylates can be calculated approximately:

$$1/Tg = \sum_{n=1}^{n=x} Wn/Tg_n; \quad \sum_n W_n = 1$$

where

Tg=glass transition temperature of the poly(meth) acrylate;

$W_n$=Weight fraction of the nth monomer;

$Tg_n$=glass transition temperature of the homopolymer of the nth monomer; and x=number of different monomers.

The preparation of the (meth)acrylate copolymers (A) for use in accordance with the invention also has no special features as to method but takes place with the aid of the method of continuous or batchwise free-radically initiated copolymerization, which are known and customary in the field of plastics, in bulk, solution, emulsion, miniemulsion or microemulsion under atmospheric pressure or superatmospheric pressure in stirred vessels, autoclaves, tubular reactors, loop reactors or Taylor reactors at temperatures from 50 to 200° C.

Examples of suitable copolymerization methods are described in patent applications DE 197 09 465 A1, DE 197 09 476 A1, DE 28 48 906 A1, DE 195 24 182 A1, DE 198 28 742 A1, DE 196 28 143 A1, DE 196 28 142 A1, EP 0 554 783 A1, WO 95/27742, WO 82/02387 or WO 98/02466.

Examples of suitable free-radical initiators are dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates; potassium, sodium or ammonium peroxodisulfate; azo initiators, examples being azodinitriles such as azobisiso-butyronitrile; C—C-cleaving initiators such as benzopinacol silyl ether; or a combination of a nonoxidizing initiator with hydrogen peroxide. It is also possible to use combinations of the above-described initiators.

Further examples of suitable initiators are described in German Patent Application DE 196 28 142 A1, page 3, line 49 to page 4, line 6.

It is preferred to add comparatively large amounts of free-radical initiator, with the proportion of the initiator in the reaction mixture, based in each case on the total amount of the monomers (a) and of the initiator, being with particular preference from 0.2 to 20% by weight, with very particular preference from 0.5 to 15% by weight, and in particular from 1.0 to 10% by weight.

Furthermore, thiocarbonylthio compounds or mercaptans such as dodecyl mercaptan may be used as chain transfer agents or molecular weight regulators.

Preferably, the nature and amount of the (meth)acrylate copolymers (A) are selected such that the coating materials, adhesives and sealing compounds of the invention possess after curing a storage modulus E' in the rubber-elastic range of at least $10^{7.6}$ Pa and a loss factor tan δ at 20° C. of not more than 0.10, the storage modulus E' and the loss factor having been measured by means of dynamic mechanical thermoanalysis on free films having a thickness of 40±10 μm (cf. German Patent DE 197 09 467 C2).

The amount of the above-described (meth)acrylate copolymers (A) in the coating materials, adhesives and sealing compounds of the invention may vary widely. The amount is dependent in particular on the functionality of the binders on the one hand and on the functionality of the below-described adducts (B) and of the crosslinking agents (D), on the other. Preferably, the amount is from 5.0 to 80, more preferably from 6.0 to 75, with particular preference from 7.0 to 70, with very particular preference from 8.0 to 65, and in particular from 9.0 to 60% by weight, based in each case on the solids content of the coating materials, adhesives and sealing compounds of the invention.

The binder component for use in accordance with the invention may contain customary and known additives (C) in effective amounts. The essential factor is that they do not inhibit or completely prevent the crosslinking reactions.

Examples of suitable additives (C) are color and/or effect pigments, organic and inorganic, transparent or opaque fillers, nanoparticles, reactive diluents curable thermally and/or with actinic radiation, low-boiling organic solvents and high-boiling organic solvents ("long solvents"), water, UV absorbers, light stabilizers, free-radical scavengers, thermally unstable free-radical initiators, photoinitiators and photocoinitiators, other, additional binders, crosslinking agents as used in one-component systems, catalysts for thermal crosslinking, devolatilizing agents, slip additives, polymerization inhibitors, defoamers, emulsifiers, wetting agents and dispersants, adhesion promoters, flow control agents, film-forming auxiliaries, sag control agents (SCAs), rheology control additives (thickeners), flame retardants, siccatives, dryers, antiskinning agents, corrosion inhibitors, waxes, flatting agents, precursors of organically modified ceramic materials, or additional binders.

The nature and amount of the additives (C) depend on the intended use of the coatings produced with the aid of the coating materials of the invention.

If, for example, a coating material of the invention is used to produce solid-color topcoats or basecoats, it normally comprises color and/or effect pigments (C) and also, if desired, opaque fillers. If a coating material of the invention is used, for example, to produce clearcoats or sealers—which is the preferred end use—these additives (C) are of course not present in the coating material in question.

Examples of suitable effect pigments (C) are metal flake pigments such as commercial aluminum bronzes, aluminum bronzes chromated in accordance with DE 36 36 183 A1, and commercial stainless steel bronzes and also nonmetallic effect pigments, such as pearlescent and interference pigments, for example. For further details, reference is made to Römpp Lexikon Lacke und Druckfarben, Georg Thieme Verlag, 1998, page 176, "Effect pigments" and pages 380 and 381, "Metal oxide-mica pigments" to "Metal pigments".

Examples of suitable inorganic color pigments (C) are titanium dioxide, iron oxides, Sicotrans yellow, and carbon black. Examples of suitable organic color pigments (C) are thioindigo pigments, indanthrene blue, Cromophthal red, Irgazine orange and Heliogen green. For further details, reference is made to Römpp Lexikon Lacke und Druckfarben, Georg Thieme Verlag, 1998, pages 180 and 181, "Iron blue pigments" to "Black iron oxide", pages 451 to 453 "Pigments" to "Pigment volume concentration", page 563, "Thioindigo pigments", and page 567, "Titanium dioxide pigments".

Examples of suitable organic and inorganic fillers (C) are chalk, calcium sulfates, barium sulfate, silicates such as talc or kaolin, silicas, oxides such as aluminum hydroxide or magnesium hydroxide, or organic fillers such as textile fibers, cellulose fibers, polyethylene fibers or wood flour. For further details, reference is made to Römpp Lexikon Lacke und Druckfarben, Georg Thieme Verlag, 1998, pages 250 ff., "Fillers".

Examples of suitable thermally curable reactive diluents (C) are positionally isomeric diethyl-octanediols or hydroxyl-containing hyperbranched compounds or dendrimers, as are described for example in German Patent Application DE 198 50 243, unpublished at the priority date of the present specification.

Examples of suitable reactive diluents (C) curable with actinic radiation are those described in Römpp Lexikon Lacke und Druckfarben, Georg Thieme Verlag, Stuttgart, N.Y., 1998, on page 491 under the key word "Reactive diluents".

Examples of suitable low-boiling organic solvents (C) and high-boiling organic solvents (C) ("long solvents") are ketones such as methyl ethyl ketone or methyl isobutyl ketone, esters such as ethyl acetate or butyl acetate, ethers such as dibutyl ether or ethylene glycol, diethylene glycol, propylene glycol, dipropylene glycol, butylene glycol or dibutylene glycol, dimethyl, diethyl or dibutyl ether, N-methylpyrrolidone or xylenes, or mixtures of aromatic hydrocarbons such as Solventnaphtha® or Solvesso®.

Examples of suitable thermally unstable free-radical initiators (C) are organic peroxides, organic azo compounds, or C—C-cleaving initiators such as dialkyl peroxides, peroxocarboxylic acids, peroxodicarbonates, peroxide esters, hydroperoxides; ketone peroxides, azodinitriles or benzpinacol silyl ether.

Examples of suitable catalysts (C) for the crosslinking are dibutyltin dilaurate, lithium decanoate or zinc octoate.

Examples of suitable photoinitiators and coinitiators (C) are described in Römpp Lexikon Lacke und Druckfarben, Georg Thieme Verlag, Stuttgart, 1998, pages 444 to 446.

Examples of suitable other, additional binders (C) are oligomeric and polymeric linear and/or branched and/or block, comb and/or random (co)polymers of ethylenically unsaturated monomers, curable thermally and/or with actinic radiation, or polyaddition resins and/or polycondensation resins, as described in Römpp Lexikon Lacke und Druckfarben, Georg Thieme Verlag, Stuttgart, N.Y., 1998, page 457: "Polyaddition" and "Polyaddition resins (polyadducts)", pages 463 and 464: "Polycondensates", "Polycondensation" and "Polycondensation resins", and pages 73 and 74: "Binders". Further examples of suitable other, additional binders (C) are the poly(meth)acrylates or acrylate copolymers described in the patent DE 197 36 535 A1, polyesters, especially those described in the patents DE 40 09 858 A1 or DE 44 37 535 A1, alkyds, acrylated polyesters, polylactones, polycarbonanes, polyethers, epoxy resin-amine adducts, (meth)acrylatediols, partially hydrolyzed polyvinyl esters, polyurethanes and acrylated polyurethanes, such as those described in patents EP 0 521 928 A1, EP 0 522 420 A1, EP 0 522 419 A1, EP 0 730 613 A1 or DE 44 37 535 A1, or polyureas.

Examples of suitable additional crosslinking agents (C) are amino resins, as described, for example, in Römpp Lexikon Lacke und Druckfarben, Georg Thieme Verlag, 1998, page 29, "Amino resins", in the text book "Lackadditive" [Coatings additives] by Johan Bieleman, Wiley-VCH, Weinheim, N.Y., 1998, pages 242 ff., in the book "Paints, Coatings and Solvents", second, completely revised edition, Eds. D. Stoye and W. Freitag, Wiley-VCH, Weinheim, N.Y., 1998, pages 80 ff., in the patents U.S. Pat. No. 4,710,542 A1 or EP-B-0 245 700 A1, and in the article by B. Singh and coworkers, "Carbamylmethylated Melamines, Novel Crosslinkers for the Coatings Industry", in Advanced Organic Coatings Science and Technology Series, 1991, Volume 13, pages 193 to 207; carboxyl-containing compounds or resins, as described for example in the patent DE 196 52 813 A1, compounds or resins containing epoxide groups, as described for example in the patents EP 0 299 420 A1, DE 22 14 650 B1, DE 27 49 576 B1, U.S. Pat. No. 4,091,048 A1 or U.S. Pat. No. 3,781,379 A1, blocked polyisocyanates, as described for example in the patents U.S. Pat. No. 4,444,94 A1, DE 196 17 C86 A1, DE 196 31 269 A1, EP 0 004 571 A1 or EP 0 582 051 A1, and/or tris(alkoxycarbonylamino)triazines, as described in the patents U.S. Pat. Nos. 4,939,213 A1, 5,084,541 A1, 5,288,865 A1 or EP 0 604 922 A1.

Examples of suitable devolatilizers (C) are diazadicycloundecane or benzoin.

Examples of suitable emulsifiers (C) are nonionic emulsifiers, such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols.

Examples of suitable wetting agents (C) are siloxanes, compounds containing fluorine, carboxylic monoesters, phosphoric esters, polyacrylic acids and copolymers thereof, or polyurethanes.

An example of a suitable adhesion promoter (C) is tricyclodecanedimethanol.

Examples of suitable film-forming auxiliaries (C) are cellulose derivatives such as cellulose acetobutyrate (CAB).

Examples of suitable transparent fillers (C) are those based on silicon dioxide, aluminum oxide or zirconium oxide; for further details, reference is made to Römpp Lexikon Lacke und Druckfarben, Georg Thieme Verlag, Stuttgart, 1998, pages 250 to 252.

Examples of suitable sag control agents (C) are ureas, modified ureas and/or silicas, as are described, for example, in the references EP 0 192 304 A1, DE 23 59 923 A1, DE 18 05 693 A1, WO 94/22968, DE 27 51 761 C1, WO 97/12945 or "farbe+lack", November 1992, pages 829 ff.

Examples of suitable rheology control additives (C) are those known from the patents WO 94/22968, EP 0 276 501 A1, EP 0 249 201 A1 or WO 97/12945; crosslinked polymeric microparticles, as disclosed for example in EP 0 008 127 A1; inorganic phyllosilicates such as aluminum-magnesium silicates, sodium-magnesium phyllosilicates and sodium-magnesium-fluorine-lithium phyllosilicates of the montmorillonite type; silicas such as Aerosils, or synthetic polymers having ionic and/or associative groups, such as polyvinyl alcohol, poly(meth)acrylamide, poly(meth)acrylic acid, poly-vinylpyrrolidone, styrene-maleic anhydride or ethylene-maleic anhydride copolymers and their derivatives, or hydrophobically modified ethoxylated urethanes or polyacrylates.

An example of suitable flatting agent (C) is magnesium stearate.

Examples of suitable precursors (C) for organically modified ceramic materials are hydrolyzable organometallic compounds, especially of silicon and aluminum.

Further examples of the additives (C) recited above, and examples of suitable UV absorbers, free-radical scavengers, flow control agents, flame retardants, siccatives, dryers, antiskinning agents, corrosion inhibitors and waxes (C) are described in detail in the textbook "Lackadditive" by Johan Bieleman, Wiley-VCH, Weinheim, N.Y., 1998.

The preparation of the binder component for use in accordance with the invention has no special features, but instead takes place in a customary and known manner by mixing of the above-described components (A) and, if desired, (C) in suitable mixing equipment such as stirred vessels, dissolvers, stirred mills, or extruders.

The second component of the coating materials, adhesives and sealing compounds of the invention comprises at least one adduct (B).

The adduct (B) can be prepared from a diisoyanate (b1) and a compound I (b2).

Examples of suitable diisocyanates are isophorone diisocyanate (5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)-cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclo-hexane, dicyclohexylmethane 2,4'-diisocyanate, tri-methylene diisocyanate, tetramethylene diisocyanate, pentamethylene diisocyanate, hexamethylene diisocyanate (HDI), ethylethylene diisocyanate, trimethylhexane diisocyanate, heptamethylene diisocyanate or diisocyanates derived from dimeric fatty acids, as sold under the commercial designation DDI 1410 by Henkel and described in patents WO 97/49745 and WO 97/49747, especially 2-heptyl-3,4-bis(9-isocyanatononyl)-1-pentylcyclohexane, or 1,2-, 1,4- or 1,3-bis(iso-cyanatomethyl)cyclohexane, 1,2-, 1,4- or 1,3-bis(2-iso-cyanatoeth-1-yl)cyclohexane, 1,3-bis(3-isocyanatoprop-1-yl)cyclohexane, 1,2-, 1,4- or 1,3-bis(4-iso-cyanatobut-1-y) or is4-iso-cyanatocyclohexyl)methane with a trans/trans content of up to 30% by weight, preferably 25% by weight and in particular 20% by weight, as described by patent applications DE 44 14 032 A1, GB 1220717 A1, DE 16 18 795 A1 or DE 17 93 785 A1, preferably isophorone diisocyanate, 5-isocyanato-1-(2-isocyanato-eth-1-yl)-1,3,3-trimethyl-cyclohexane, 5-isocyanato-1-(3-isocyanatoprop-1-yl)-1,3,3-trimethyl-cyclohexane, 5-isocyanato-(4-isocyanatobut-1-yl)-1,3,3-trimethyl-cyclohexane, 1-isocyanato-2-(3-isocyanatoprop-1-yl)-cyclohexane, 1-isocyanato-2-(3-isocyanatoeth-1-yl)-cyclohexane, 1-isocyanato-2-(4-isocyanatobut-1-yl)-cyclohexane or HDI, especially HDI.

The compounds I have an isocyanate-reactive functional group. Examples of suitable isocyanate-reactive functional groups are hydroxyl groups, thiol groups and primary or secondary amino groups.

The compounds I have the general formula I:

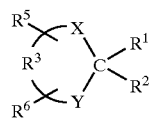

(I), in which general formula I $R^1$ and $R^2$ independently of one another are hydrogen atoms or alkyl radicals having 1 to 10 carbon atoms, preferably methyl, ethyl, propyl, isopropyl, n-butyl, sec-butyl, tert-butyl, n-pentyl, isoamyl, n-hexyl, n-heptyl, n-octyl, 2-ethyl-hex-1-yl, n-nonyl or n-decyl, especially isopropyl;

X and Y independently of one another are oxygen atoms, sulfur atoms or radicals >N—$R^6$, in which $R^6$ is an aliphatic radical having 1 to 30 carbon atoms whose carbon chain may be interrupted by one or more oxygen atoms, such as the above-described radicals $R^1$ and $R^2$, undecyl, dodecyl, tridecyl, tetradecyl, pentadecyl, hexadecyl, heptadecyl, octadecyl, nonadecyl or eicosanyl or oligo(ethylene glycol)-1-yl, oligo(propylene glycol)-1-yl or oligo(butylene glycol)-1-yl or the corresponding mixed oligomers having a degree of oligomerization of up to 15. Furthermore, $R^6$ may be an aromatic radical having 6 to 30 carbon atoms, such as phenyl, naphthyl or biphenyl-1-yl.

$R^3$ is an alkylene radical having 1 to 5 carbon atoms, such as methylene, eth-1-2-ylene, trimethylene, tetramethylene or pentamethylene.

$R^4$ and $R^5$ independently of one another are hydrogen atoms, isocyanate-reactive functional groups, or radicals $R^6$.

It is essential for the compounds I that one radical $R^4{}_1$, $R^5$ or $R^6$ contains an isocyanate-reactive functional group or one radical $R^4$ or $R^5$ is an isocyanate-reactive functional group, the other radicals $R^4$, $R^5$ or $R^6$—if present—containing no isocyanate-reactive functional groups.

Examples of highly suitable compounds I are
dioxolanes of the general formula II:

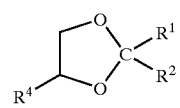

(II), dioxanes of the general formula III:

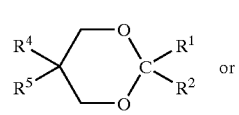

(III)

or oxazolidines of the general formula IV:

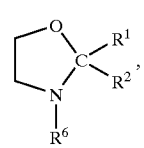

(IV)

in which the radicals $R^1$, $R^2$, $R^4$, $R^5$ and $R^6$ are as defined above, the radicals $R^4$ or $R^6$ containing an isocyanate-reactive functional group.

Examples of suitable dioxolanes (II), dioxanes (III) and oxazolidines (IV) and their preparation are described in detail in the examples of German Patent Application DE 196 09 617 A1, page 5, line 54 to page 9, line 27.

Of these, the oxazolidines (IV) have particular advantages, and so are used with particular preference in accordance with the invention. Examples of especially suitable oxazolidines (IV) are N-(2-hydroxy-ethyl)-1,3-oxazolidine or N-(2-hydroxyethyl)-2-iso-propyl-1,3- oxazolidine, as described on page 6, Table 1, No. 5a and No. 5b of German Patent Application DE 196 09 617 A1.

For the preparation of the adduct (B) it is essential that the molar ratio of isocyanate groups in the diisocyanates (b1) to the isocyanate-reactive functional groups in the compound I (b2) is from 0.8:1.2 to 1.2:0.8, preferably from 0.9:1.1 to 1.1:0.9, and in particular 1:1.

The amount of the above-described adducts (B) in the coating materials, adhesives and sealing compounds of the invention may vary very widely. It depends in particular on the functionality of the crosslinking agents (D) and of the (meth)acrylate copolymer (A) and on the intended viscosity of the coating materials, adhesives and sealing compounds of the invention. The amount is preferably from 20 to 90, more preferably from 22 to 85, with particular preference from 23 to 80, with very particular preference from 24 to 75, and in particular from 25 to 70% by weight, based in each case on the solids content of the coating materials, adhesives and sealing compounds of the invention, it being possible to choose the amount of (B) to be up to twice as high as the amount of (A).

The second component to be used in accordance with the invention further comprises at least one reactive crosslinking agent (D). This crosslinking agent (D) may, however, also be present in a third component for use in accordance with the invention.

In the context of the present invention, a reactive crosslinking agent (D) is a crosslinking agent which in contrast to the above-described crosslinking agents (C) for one-component systems already reacts below 90, preferably below 70, more preferably below 60, with particular preference below 50, with special preference below 40, with very particular preference below 30° C., and in particular at room temperature W the above-described (meth)acrylate copolymers (A), the adducts (B) following the elimination of ketone, and with any reactive diluents (C) that may be present for the thermal curing.

Examples of suitable reactive crosslinking agents (D) are polyisocyanates which contain on average more than two isocyanate groups in the molecule and may have been hydrophilically or hydrophobically modified. The polyisocyanates (D) are preferably liquid and of low viscosity, so that they can easily be incorporated into the second component or into the mixture of first and second components. Particular preference is given to the use of polyisocyanates (D) having from 2 to 5 isocyanate groups per molecule and having viscosities at 23° C. of from 100 to 2000 mpa.s. If desired, small amounts of organic solvents (C), preferably from 1 to 25% by weight, based-on pure polyisocyanate (D), may be added to the polyisocyanates (D) in order thus to increase the ease of incorporation of the polyisocyanate (D) and, if appropriate, to reduce its viscosity to a level within the abovementioned ranges.

Examples of suitable polyisocyanates (D) are polyurethane prepolymers containing isocyanate groups, which can be prepared by reacting polyols with an excess of the above-described diisocyanates (b1) and are preferably of low viscosity. It is also possible to use polyisocyanates (D) containing isocyanurate, biuret, allophanate, iminooxadiazinedione, urethane, urea and/or uretdione groups. Polyisocyanates containing urethane groups, for example, are prepared by reacting some of the isocyanate groups with polyols, such as trimethylolpropane and glycerol, for example. It is preferred to use aliphatic or cycloaliphatic diisocyanates (b1), especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate or dicyclohexylmethane 4,4'-diiso-cyanate, or mixtures of these diisocyanates.

Very particular preference is given to the use of mixtures of polyisocyanates (D) which contain uretdione and/or isocyanurate groups and/or allophanate groups and are based on hexamethylene diisocyanate or isophorone diisocyanate, as formed by catalytic oligomerization of hexamethylene diisocyanate or isophorone diisocyanate using appropriate catalysts.

The amount of the above-described crosslinking agents (D) in the coating materials, adhesives and sealing compounds of the invention may also vary very widely. In particular, it depends on the functionality of the crosslinking agents (D) and of the (meth)acrylate copolymers (A) and on the amount of adduct (B). The amount is preferably from 20 to 70, more preferably from 22 to 65, with particular preference from 23 to 60, with very particular preference from 24 to 55, and in particular from 25 to 50% by weight, based in each case on the solids content of the coating materials, adhesives and sealing compounds of the invention.

In addition, the second component for use in accordance with the invention, or—if used—additionally, or only, the third component for use in accordance with the invention may comprise at least one of the above-described additives (C), provided these do not undergo unwanted reactions with the adducts (B) and/or crosslinking agents (D), such as decomposition reactions or premature crosslinking reactions, for instance.

Otherwise, all or some of the above-described additives (C) employed in each case in the coating materials, adhesives and sealing compounds of the invention may be present in the form of an independent, separate, third or fourth component.

The preparation of the coating materials, adhesives and sealing compounds of the invention from the components described above has no particular methodological features but instead is carried out with the aid of the customary and known, above-described mixing apparatuses and methods, or by means of customary two-component or multicomponent metering and mixing units. Ideally, thorough mixing is carried out by hand.

The coating materials, adhesives and sealing compounds of the invention are used to produce coatings, adhesive films and seals on and/or in primed and unprimed substrates. In particular, the coating materials of the invention are used to produce solid-color topcoats, clearcoats, and also basecoats and clearcoats in multicoat color and/or effect coating systems.

In methodological terms, the application of the coating materials of the invention has no special features but instead can be carried out by means of any customary application method, such as spraying, knifecoating, brushing, flowcoating, dipping, trickling or rolling, for example. It is preferred to employ spray application methods, such as, for example, compressed air spraying, airless spraying, high-speed rotation, electrostatic spray application (ESTA), alone or in conjunction with hot spray application such as hot air spraying, for example.

Suitable substrates are surfaces which are undamaged by curing of the coating materials, adhesives and/or sealing compounds present thereon using heat and, if appropriate, actinic radiation; examples include metals, plastics, wood, ceramic, stone, textile, fiber assemblies, leather, glass, glass fibers, glass wool and rock wool, mineral-bound and resin-bound building materials, such as plasterboards and cement boards or roofing tiles, and also combinations of these materials. Accordingly, the coating materials, adhesives and sealing compounds of the invention are also suitable for applications outside the automotive industry. Here they are particularly suitable for the coating, bonding and/or sealing of furniture, windows, doors, the interior and exterior of constructions, and for industrial coating, including coil coating, container coating, and the impregnation or coating of electrical engineering components. In the context of industrial coatings, they are suitable for the coating, bonding and/or sealing of virtually all parts for private or industrial use, such as radiators, domestic appliances, small metal parts such as nuts and bolts, wheel caps, rims, packaging, or electrical engineering components such as motor windings or transformer windings.

In the case of electrically conductive substrates it is possible to use primers which are prepared in a customary and known manner from electrodeposition coating (EDC) materials. For this purpose both anodic (AED) and cathodic (CED) electrodeposition coating materials are suitable, but especially CED coating materials.

The electrodeposition coating or electrodeposition coating film may be overcoated with a surfacer which is cured either alone or together with the electrodeposition coating film (wet-on-wet process). Overcoating with a surfacer is undertaken in particular in regions exposed to severe mechanical stress, such as by stonechipping, for example.

Examples of suitable cathodic electrodeposition coating materials and, where appropriate, of wet-on-wet processes are described in Japanese Patent Application 1975-142501 (Japanese laid-open specification JP 52-065534 A2, Chemical Abstracts No. 87: 137427) or in the patents and patent applications U.S. Pat. Nos. 4,375,498 A1, 4,537,926 A1, 4,761,212 A1, EP 0 529 335 $A_1$, DE 41 25 459 A1, EP 0 595 186 A1, EP 0 074 634 A1, EP 0 505 445 A1, DE 42 35 778 A1, EP 0 646 420 A1, EP 0 639 660 A1, EP 0 817 648 A1, DE 195 12 017 C1, EP 0 192 113 A2, DE 41 26 476 A1 or WO 98/07794.

Similarly, appropriate surfacers, especially aqueous surfacers, which are also referred to as antistonechip primers or functional coats, are known from the patents and patent applications U.S. Pat. No. 4,537,926 A1, EP 0 529 335 A1, EP 0 595 186 A1, EP 0 639 660 A1, DE 44 38 504 A1, DE 43 37 961 A1, WO 89/10387, U.S. Pat. Nos. 4,450,200 A1, 4,614,683 A1 or WO 94/26827.

It is also possible to coat, bond or seal primed or unprimed plastics parts made, for example, of ABS, AMMA, ASA, CA, CAB, EP, UF, CF, MF, MPF, PF, PAT, PA, PE, HDPE, LDPE, LLDPE, UHMWPE, PC, PC/PBT, PC/PA, PET, PMMA, PP, PS, SB, PUR, PVC, RF, SAN, PBT, PPE, POM, PUR-RIM, SMC, BMC, PP-EPDM and UP (abbreviated codes in accordance with DIN 7728P1). In the case of unfunctionalized and/or apolar substrate surfaces, these may be subjected prior to coating in a known manner to a pretreatment, such as with a plasma or by flaming, or may be provided with an aqueous primer.

In accordance with the invention, the clearcoats and solid-color topcoats of the invention are produced by applying the coating materials of appropriate composition, according to the invention, to the substrates described above, after which the resulting clearcoat and solid-color topcoat films are cured.

In accordance with the invention, the adhesive films and seals of the invention are produced by applying the adhesives and sealing compounds of the invention onto and/or into the substrates described above. In the case of the adhesive bonding of substrates, the surfaces of two or more substrates to be bonded are preferably coated with the adhesive of the invention, after which the surfaces in question are brought into contact, under pressure if appropriate, and the resulting adhesive films are cured.

In accordance with the invention, a multicoat color and/or effect coating system according to the invention is produced on a primed or unprimed substrate by (1) applying a basecoat to the substrate,
(2) drying and/or partial curing or full curing of the basecoat film,
(3) applying a clearcoat to the dried and/or partially cured basecoat film or the cured basecoat, and
(4) curing the clearcoat film together with the basecoat film, or separately curing the clearcoat film.

In a first preferred variant, a conventional basecoat and a clearcoat of the invention are used.

In a second preferred variant, a conventional clearcoat and a basecoat of the invention are used.

In a third preferred variant, a basecoat of the invention and a clearcoat of the invention are used.

Examples of conventional basecoats are known from patent applications EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE-A-43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1 or EP 0 817 684, column 5, lines 31 to 45.

Conventional clearcoats are one-component or multicomponent clearcoats, powder clearcoats, powder slurry clearcoats, UV-curable clearcoats or sealers, as known from the patent applications, patents and publications DE 42 04 518 A1, EP 0 594 068 A1, EP 0 594 071 A1, EP 0 594 142 A1, EP 0 604 992 A1, EP 0 596 460 A1, WO 94/10211, WO 94/10212, WO 94/10213, WO 94/22969 or WO 92/22615, U.S. Pat. Nos. 5,474,811 A1, 5,356,669 A1 or 5,605,965 A1, DE 42 22 194 A1, the product information bulletin from BASF Lacke+Farben AG, "Pulverlacke" [Powder coatings], 1990, the BASF Coatings AG brochure "Pulverlacke, Pulverlacke für industrielle Anwendungen" [Powder coating materials, powder coatings for industrial applications], January 2000, U.S. Pat. No. 4,268,542 A1, DE 195 40 977 A1, DE 195 18 392 A1, DE 196 17 086 A1, DE-A-196 13 547, DE 196 52 813 A1, DE-A-198 14 471 A1, EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1, EP 0 002 866 A1, DE 197 09 467 A1, DE 42 03 278 A1, DE 33 16 593 A1, DE 38 36 370 A1, DE 24 36 186 A1, DE 20 03 579 B1, WO 97/46549, WO 99/14254, U.S. Pat. Nos. 5,824,373 A1, 4,675,234 A1, 4,634,602 A1, 4,424,252 A1, 4,208,313 A1, 4,163,810 A1, 4,129,488 A1, 4,064,161 A1, 3,974,303 A1, EP 0 844 286 A1, DE 43 03 570 A1, DE 34 07 087 A1, DE 40 11 045 A1, DE 40 25 215 A1, DE 38 28 098 A1, DE 40 20 316 A1 or DE 41 22 743 A1.

The curing of the applied coating materials, adhesive films and sealing compounds of the invention likewise has no special features as to method but instead takes place in general at room temperature over the course of 30 minutes to several days, for example, from 4 to 10 days. Curing can be assisted by the application of heat and/or actinic radiation. This is particularly the case when the coating materials, adhesive films and sealing compounds of the invention include constituents (C) which can be activated with actinic radiation, and/or comprise constituents (C) which are thermally curable, such as, for example, the crosslinking agents (C) for one-component systems. It is also the case, furthermore, when customary and known clearcoats or basecoats curable thermally and/or with actinic radiation are employed in the preparation of the multicoat color and/or effect coating systems of the invention. Curing with heat and actinic radiation is referred to in the art, inter alia, as "dual cure".

For thermal curing, the customary and known equipment, such as infrared and near-infrared lamps, hot air blowers, or circulating-air ovens are suitable.

In the context of the present invention, actinic radiation is electromagnetic radiation such as near infrared, visible light, UV light or x-rays, but especially UV light, and corpuscular radiation, especially electron beams. For curing, the corresponding radiation sources, such as UV lamps, for instance, are employed.

The coating materials, adhesives and sealing compounds of the invention have a high solids content with low viscosity and a long pot life.

The resulting coatings of the invention, especially the solid-color topcoats, clearcoats and multicoat color and/or effect coating systems, possess high hardness, flexibility and chemical resistance, excellent flowout, very good intercoat adhesion, an outstanding overall visual impression, very good weathering stability, very high scratch resistance, and very good polishability.

The adhesive films of the invention are of high and long-term bond strength even under extreme and/or very sharply and rapidly changing climatic conditions.

The seals of the invention provide complete and long-term sealing against chemically aggressive substances.

Therefore, the primed and unprimed substrates of the invention that are coated with at least one coating of the invention, bonded with at least one adhesive film of the invention and/or sealed with at least one seal of the invention possess not only the advantages set out above but also a particularly long service life, which makes them particularly valuable from an economic standpoint.

EXAMPLES

Preparation Example 1
The Preparation of a Methacrylate Copolymer (A) for use in Accordance with the Invention 757.2 g of Solventnaphtha® were weighed out into a laboratory reactor having a useful volume of 4 l and equipped with a stirrer, two dropping funnels for the monomer feed and the initiator feed, a nitrogen inlet pipe, thermometer, and reflux condenser, and this initial charge was heated to 140° C. The initiator feed, consisting of 78.9 g of Solventnaphtha® and 38.1 g of tert-butyl peroxy-2-ethylhexanoate, was metered in at a uniform rate over the course of four hours. The monomer feed, consisting of 888.6 g of ethylhexyl acrylate, 258 g of hydroxyethyl methacrylate, 573.3 g of methylpropane-1,3-diol monoacrylate and 191.1 g of styrene, was metered in at a uniform rate over the course of 3.5 hours. The monomer feed was started 15 minutes after the initiator feed. During the copolymerization, the temperature was held at 140° C. Following the addition, polymerization was continued at 140° C. for two hours. The resulting methacrylate copolymer solution (A) had a solids content of 70%. Subsequently, the temperature of the solution was lowered to 120° C. and its solid contents was adjusted to 65% using 214.8 g of Solventnaphtha®. The viscosity (original) was 25.2 dPas.

The resulting methacrylate copolymer (A) for use in accordance with the invention had a (theoretical) hydroxyl number of 175 mg KOH/g, a number-average molecular weight Mn of 3973, a weight-average molecular weight Mw of 13,600, and a polydispersity Mw/Mn of 3.42.

Preparation Example 2
The Preparation of an Adduct (B)

N-(2-Hydroxyethyl)-2-isopropyl-1,3-oxazolidine was reacted with HDI in a molar ratio of 1:1 to give the adduct (B), as described on page 9, lines 7 to 17, line 6, "AV4—Monourethanes from HDI", of DE 196 09 617 A1.

Examples 1 and 2
The Preparation of Clearcoats and Clearcoat Finishes of the Invention For Example 1, 34 parts by weight of the solution of the (meth)acrylate copolymer (A) from Preparation Example 1 (solids content: 65% by weight), 30 parts by weight of the adduct (B) from Preparation Example 2, 15.8 parts by weight of Basonat® HI 190 (commercial HDI trimer from BASF AG) and 0.05 part by weight of dibutyltin dilaurate, and a solvent mixture of butylglycol acetate, xylene, ethoxypropyl acetate and GB ester (glycolic acid butyl ester) in a weight ratio of 2:1:1:2, to which, based on the solvent mixture, 0.15% by weight of Baysilon® OL44 (commercial silicone additive from Bayer AG) had been admixed, were mixed with one another and homogenized to give a clearcoat having a solids content of 66.79% by weight (1 g/1 h/125° C.).

For Example 2, 15.8 parts by weight of the solution of the (meth)acrylate copolymer (A) from Preparation Example 1 (solids content 65% by weight), 20 parts by weight of the adduct (P) from Preparation Example 2, 11.3 parts by weight of Basonat® HI 190 and 0.05 parts by weight of dibutyltin dilaurate, and the solvent mixture described above, were mixed with one another and homogenized to give a clearcoat having a solids content of 70.44% by weight (1 g/1 h/125° C.).

The clearcoats of Examples 1 and 2 were applied with a film thickness of 40-45 $\mu$m to test panels which had an electrodeposition coat with a film thickness of 18-22 $\mu$m, a surfacer with a film thickness of 35-40 $\mu$m and a black basecoat with a film thickness of 12-15 $\mu$m lying atop one another, and were crosslinked at 80° C.

For the measurement of the scratch resistance, these panels were stored for at least 2 weeks at room temperature following application.

The scratch resistance of the clearcoats 1 and 2 was assessed with the aid of the BASF brush test as described in FIG. 2 on page 28 of the article by P. Betz and A. Bartelt, Progress in Organic Coatings, 22 (1993), pages 27-37, albeit with modification as to the weight used (2000 g instead of the 280 g specified therein), as follows:

In the test, the paint surface was damaged using a mesh fabric loaded with a mass. The mesh fabric and the paint surface were wetted copiously with a detergent solution. The test panels were moved back and forth under the mesh fabric in reciprocal movements by means of a motor drive.

The test specimen was an eraser (4.5×2.0 cm, broad face perpendicular to the direction of scratching) over which a nylon mesh fabric (No. 11, 31 $\mu$m mesh size, Tg 50° C.) was stretched. The superimposed weight was 2000 g.

Prior to each test, the mesh fabric was replaced, with the running direction of the fabric meshes parallel to the direction of scratching. Using a pipette, about 1 ml of a freshly agitated 0.25% strength Persil solution was applied in front of the eraser. The rotary speed of the motor was adjusted so that 80 double strokes were performed within a time of 80 s. After the test, the remaining washing liquid was rinsed off with cold tap water and the test panels were blown dry with compressed air. Measurements were made of the gloss (20°) in accordance with DIN 67530 before and after damage (measurement direction perpendicular to the direction of scratching) and after reflow. The results are located in the table.

One part of the unstoved test panels was used to determine the Fischer-scope penetration hardness at 100° C. for 20 minutes and another part of the unstoved test panels was stoved at 140° C. for 20 minutes. The results are likewise to be found in the table.

TABLE 1

Scratch resistance and reflow after the brush test and Fischer-scope penetration hardness of the clearcoat finishes of Examples 1 and 2

| Test | Examples | |
|---|---|---|
| | 1 | 2 |
| Initial: | | |
| Gloss (20°) to DIN 67530 | 86.3 | 87.2 |
| Penetration hardness (s) | | |
| 100° C. | 134 | 108.7 |
| 140° C. | 138.9 | 134.7 |
| Brush test: | | |
| Gloss (20°) to DIN 67530 | | |
| Room temperature | 36.4 | 52.8 |
| 2h/40° C. | 41.7 | 56.5 |
| 2h/60° C. | 80.5 | 83.7 |
| dGloss | 49.9 | 34.4 |
| dGloss 40° C. | 44.6 | 30.7 |
| dGloss 60° C. | 5.8 | 3.5 |
| Reflow 40° C. | 10.62 | 10.76 |
| Reflow 60° C. | 88.38 | 89.83 |

The results in the table demonstrate the excellent performance properties of the clearcoat finishes of the invention.

What is claimed is:

1. A multicomponent composition, wherein the composition is one of a coating material, an adhesive, and a sealing compound, comprising (A) at least one (meth)acrylate copolymer having an OH number from 130 to 200, a glass transition temperature of from −35 to +60° C., a number-average molecular weight of from 1,000 to 5,000 daltons and a mass-molecular weight of from 2,000 to 20,000 daltons, which contains, based on the (meth)acrylate copolymer (A), up to 90% by weight of hydroxyl-containing, olefinically unsaturated monomers (a) in copolymerized form, of which (a1) from 20 to 90% by weight, based on the (meth)acrylate copolymer (A), are at least one of hydroxybutyl (meth)acrylate and 2-alkylpropane-1,3-diol mono(meth)acrylate, and (a2) 0 to 40% by weight, based on the (meth)acrylate copolymer (A), are other hydroxyl-containing, olefinically unsaturated monomers, and (B) at least one adduct prepared from (b1) at least one diisocyanate and (b2) at least one compound of the general formula I having an isocyanate-reactive functional group:

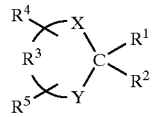

wherein:
R$^1$ and R$^2$, independently of one another, are hydrogen or an alkyl radical having 1 to 10 carbon atoms;
X and Y, independently of one another, are oxygen, sulfur, or a radical >N—R$^6$, in which R$^6$ is an aliphatic radical having 1 to 30 carbon atoms, whose carbon chain may be interrupted by one or more oxygen atoms, or is an aromatic group having 6 to 30 carbon atoms;
R$^3$ is an alkylene radical having 1 to 5 carbon atoms; and
R$^4$ and R$^5$, independently of one another, are hydrogen, an isocyanate-reactive functional group, or R$^6$;
with the proviso that i) one radical R$^4$, R$^5$, or R$^6$ contains an isocyanate-reactive functional group, or ii) one radical R$^4$ or R$^5$ is an isocyanate-reactive functional group, in which case the other radicals R$^4$, R$^5$, or R$^6$, where present, contain no isocyanate-reactive functional group;
the molar ratio of isocyanate groups in the at least one diisocyanate (b1) to the isocyanate-reactive functional group in the compound 1 is from 0.8:1.2 to 1.2:0.8.

2. The multicomponent composition of claim 1, wherein the other hydroxyl-containing, olefinically unsaturated monomer (a2) is at least one of a propoxylated allyl alcohol, an ethoxylated allyl alcohol, and a 2-hydroxyalkyl allyl ether, and is in an amount of from 0.1 to 10% by weight, based on the (meth)acrylate copolymer (A).

3. The multicomponent composition of claim 1, wherein the at least one compound of the general formula I is at least one of a dioxolane of the general formula II:

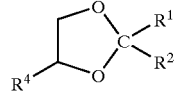

a dioxane of the general formula III:

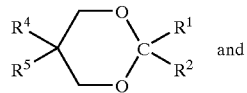

an oxazolidine of the general formula IV:

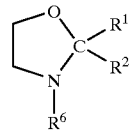

in which the radicals R$^1$, R$^2$, R$^4$, R$^5$ and R$^6$ are as defined above, and one of the radicals R$^4$ or R$^6$ contain an isocyanate-reactive functional group.

4. A multicomponent composition of claim 1, wherein the isocyanate-reactive functional group is at least one of a hydroxyl group, a thiol group, a primary amino group, and a secondary amino group.

5. A multicomponent composition of claim 1 further comprising at least one crosslinking agent comprising a polyisocyanate.

6. A multicomponent composition of claim 1 further comprising at least one of a color pigment, an effect pigment, and a color and effect pigment.

7. A process for producing a coating, wherein the coating is one of a color coating, an effect coating, and a color and effect coating, comprising applying a solid-color topcoat composition to a primed or unprimed substrate, wherein the solid-color topcoat composition comprises the multicomponent composition of claim 6.

8. The process of claim 7, wherein at least one of:
   I. the other hydroxyl-containing, olefinically unsaturated monomer (a2) is at least one of a propoxylated allyl alcohol, an ethoxylated allyl alcohol, and a 2-hydroxyalkyl allyl ether, and is in an amount of from 0.1 to 10% by weight, based on the (meth)acrylate copolymer (A);
   II. the at least one compound of the general formula I is at least one of
   a dioxolane of the general formula II:

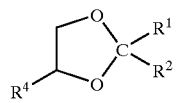

(II), a dioxane of the general formula III:

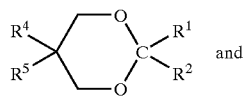

(III) and an oxazolidine of the general formula IV:

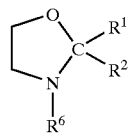

(IV)

in which the radicals $R^1$, $R^2$, $R^4$, $R^5$ and $R^6$ are as defined above, and one of the radicals $R^4$ or $R^6$ contain an isocyanate-reactive functional group;
   III. the isocyanate-reactive functional group is at least one of a hydroxyl group, a thiol group, a primary amino group, and a secondary amino group; and
   IV. the multicomponent composition further comprises at least one crosslinking agent comprising a polyisocyanate.

9. The process of claim 7, wherein the substrate comprises one of a motor vehicle body, a part for a motor vehicle body, an interior part for a motor vehicle, an exterior part of a motor vehicle, a door, a window, furniture, an industrial component, a coil, a container, and an electrical engineering component.

10. A process for producing a clearcoat finish comprising applying a clearcoat composition to a substrate, wherein the clearcoat composition comprises the multicomponent composition of claim 1, and wherein the substrate is one of primed and unprimed, and optionally the substrate further comprises a coating.

11. The process of claim 10, wherein at least one of:
   I. the other hydroxyl-containing, olefinically unsaturated monomer (a2) is at least one of a propoxylated allyl alcohol, an ethoxylated allyl alcohol, and a 2-hydroxyalkyl allyl ether, and is in an amount of from 0.1 to 10% by weight. based on the (meth)acrylate copolymer (A);
   II. the at least one compound of the general formula I is at least one of a dioxolane of the general formula II:

(II), a dioxane of the general formula III;

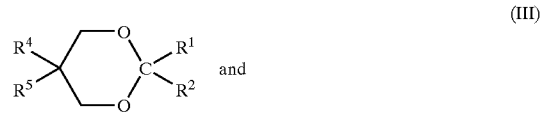

(III)
and an oxazolidine of the general formula IV:

(IV)

in which the radicals $R^1$, $R^2$, $R^4$, $R^5$ and $R^6$ are as defined above, and one of the radicals $R^4$ or $R^5$ contain an isocyanate-reactive functional group;
   III. the isocyanate-reactive functional group is at least one of a hydroxyl group a thiol group, a primary amino group, and a secondary amino group; and
   IV. the multicomponent composition further comprises at least one crosslinking agent comprising a polyisocyanate.

12. The process of claim 10, wherein the substrate comprises one of a motor vehicle body, a part for a motor vehicle body, an interior part for a motor vehicle, an exterior part of a motor vehicle, a door, a window, furniture, an industrial component, a coil, a container, and an electrical engineering component.

13. A process for producing a multicoat coating system on a primed or unprimed substrate, wherein the multicoat coating system is one of a color coating system, an effect coating system, and a color and effect coating system comprising
   (1) applying a basecoat composition to the substrate to form a basecoat film,
   (2) forming a product of Step 2 by one of
      i) drying the basecoat film,
      ii) at least partially curing the basecoat film, and
      iii) drying and at least partially curing the basecoat film,
   (3) applying a clearcoat composition to the product of Step 2 to form a clearcoat film, and (4) one of
  i) curing the clearcoat film together with the basecoat film if the basecoat film was not fully cured, and
  ii) separately curing the clearcoat film if the basecoat film was fully cured,
wherein at least one of:
(I) the basecoat composition comprises the multicomponent composition of claim 6, and
(II) the clearcoat composition comprises a multicomponent composition comprising
  (A) at least one (meth)acrylate copolymer having an OH number from 130 to 200, a glass transition temperature of from −35 to −60° C., a number-average molecular weight of from 1,000 to 5,000 daltons and a mass-molecular weight of front 2,000 to 20,000 daltons, which contains, based on the (meth)acrylate copolymer (A), up to 90% by weight of hydroxyl-containing, olefinically unsaturated monomers (a) in copolymerized form, of which
    (a1) from 20 to 90% by weight, based on the (meth)acrylate copolymer (A), are at least one of hydroxybutyl (meth)acrylate and 2-alkylpropane-1,3-diol mono(meth)acrylate, and
    (a2) 0 to 40% by weight, based on the (meth)acrylate copolymer (A), are other hydroxyl-containing, olefinically unsaturated monomers; and
  (B) at least one adduct prepared from
    (b1) at least one diisocyanate and
    (b2) at least one compound of the general formula I having an isocyanate-reactive functional group:

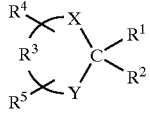

(I), wherein:
  $R^1$ and $R^2$, independently of one another, are hydrogen or an alkyl radical having 1 to 10 carbon atoms;
  X and Y, independently of one another, are oxygen, sulfur, or a radical >N—$R^6$, in which $R^6$ is an aliphatic radical having 1 to 30 carbon atoms, whose carbon chain may be interrupted by one or more oxygen atoms, or is an aromatic group having 6 to 30 carbon atoms;
  $R^3$ is an alkylene radical having 1 to 5 carbon atoms; and
  $R^4$ and $R^5$, independently of one another, are hydrogen, an isocyanate-reactive functional group, or $R^6$;
  with the proviso that i) one radical $R^4$, $R^5$, or $R^6$ contains an isocyanate-reactive functional group, or ii) one radical $R^4$ or $R^5$ is an isocyanate-reactive functional group, in which case the other radicals $R^4$, $R^5$, or $R^6$, where present, contain no isocyanate-reactive functional group;
  the molar ratio of isocyanate groups in the at least one diisocyanate (b1) to the isolate-reactive functional group in the compound I is from 0.8:1.2 to 1.2:0.8.

14. The process of claim wherein at least one of:
  I. the other hydroxyl-containing, olefinically unsaturated monomer (a2) is at least one do propoxylated allyl alcohol, an ethoxylated allyl alcohol, and a 2-hydroxyalkyl allyl ether, and is in an amount of from 0.1 to 10% by weight, based on the (meth)acrylate copolymer (A);

II. the at least one compound of the general formula 1 is at least one of a dioxolane of the general formula II:

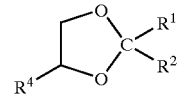

(II), a dioxane of the general formula III:

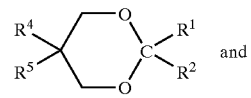

(III)

and an oxazolidine of the general formula IV:

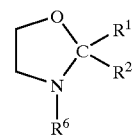

(IV)

in which the radicals $R^1$, $R^2$, $R^4$, $R^5$ and $R^6$ are as defined above, and one of the radicals $R^4$ or $R^6$ contain an isocyanate-reactive functional group;

III. the isocyanate-reactive functional group is at least one of a hydroxyl group, a thiol group, a primary amino group, and a secondary amino group; and IV. the multicomponent composition further comprises at least one crosslinking agent comprising a polyisocyanate.

15. The process of claim 13, wherein the substrate comprises one of a motor vehicle body, a part for a motor vehicle body, an interior part for a motor vehicle, an exterior part of a motor vehicle, a door, a window, furniture, an industrial component, a coil, a container and an electrical engineering component.

16. A process for producing a product, wherein the product is one of an adhesive film and a seal, comprising applying the multicomponent composition of claim 1 to at least one of on and in a primed or unprimed substrate.

17. The process of claim 16, wherein at least one of:
  I. the other hydroxyl-containing, olefinically unsaturated monomer (a2) is at least one of a propoxylated allyl alcohol, an ethoxylated allyl alcohol, and a 2-hydroxyalkyl allyl ether, and is in an amount of from 0.1 to 10% by weight, based on the (meth)acrylate copolymer (A);
  II. the at least one compound of the general formula is at least one of a dioxolane of the general formula II:

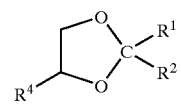

(II), a dioxane of the general formula III:

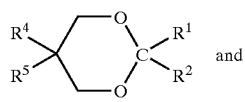 and (III)

an oxazolidine of the general formula IV:

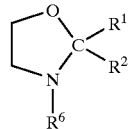 (IV)

in which the radicals $R^1$, $R^2$, $R^4$, $R^5$ and $R^6$ are as defined above, and one of the radicals $R^4$ or $R^6$ contain an isocyanate-reactive functional group;

III. the isocyanate-reactive functional group is at least one of a hydroxyl group, a thiol group, a primary amino group, and a secondary amino group; and IV. the multicomponent composition further comprises at least one crosslinking agent comprising a polyisocyanate.

18. The process of claim 16, wherein the substrate comprises one of a motor vehicle body, a part for a motor vehicle body, an interior part for a motor vehicle, an exterior part, of a motor vehicle, a door, a window, furniture, an industrial component, a coil, a container, and an electrical engineering component.

* * * * *